United States Patent
Howard et al.

(10) Patent No.: US 11,858,236 B2
(45) Date of Patent: Jan. 2, 2024

(54) FOAM CORE MIRROR CONFIGURED FOR INTERIOR AEROSPACE APPLICATIONS AND A PROCESS OF IMPLEMENTING THE SAME

(71) Applicant: Pexco Aerospace, Inc., Union Gap, WA (US)

(72) Inventors: Chris Howard, Union Gap, WA (US); Stephen V. Davis, Union Gap, WA (US)

(73) Assignee: PEXCO AEROSPACE, INC., Union Gap, WA (US)

( * ) Notice: Subject to any disclaimer, the term of this patent is extended or adjusted under 35 U.S.C. 154(b) by 0 days.

(21) Appl. No.: 16/774,541

(22) Filed: Jan. 28, 2020

(65) Prior Publication Data
US 2021/0229403 A1 Jul. 29, 2021

(51) Int. Cl.
| | | |
|---|---|---|
| *B32B 17/06* | (2006.01) | |
| *B32B 7/12* | (2006.01) | |
| *B32B 27/28* | (2006.01) | |
| *B32B 27/36* | (2006.01) | |
| *G02B 5/08* | (2006.01) | |

(52) U.S. Cl.
CPC .............. *B32B 17/066* (2013.01); *B32B 7/12* (2013.01); *B32B 27/281* (2013.01); *B32B 27/286* (2013.01); *B32B 27/365* (2013.01); *G02B 5/08* (2013.01); *B32B 2255/26* (2013.01); *B32B 2307/584* (2013.01); *B32B 2551/08* (2013.01); *B32B 2605/18* (2013.01)

(58) Field of Classification Search
CPC ....... B32B 17/066; B32B 27/365; B32B 7/12; B32B 27/286; B32B 27/281; B32B 2605/18; B32B 2551/08; B32B 2307/584; B32B 2255/26; G02B 5/08
See application file for complete search history.

(56) References Cited

U.S. PATENT DOCUMENTS

| | | | |
|---|---|---|---|
| 9,086,229 B1 * | 7/2015 | Roper | G02B 5/08 |
| 2012/0193015 A1 * | 8/2012 | Segal | C09J 5/00 |
| | | | 156/182 |
| 2013/0155497 A1 * | 6/2013 | Mochizuki | G02B 1/105 |
| | | | 359/838 |

(Continued)

FOREIGN PATENT DOCUMENTS

| | | | | | |
|---|---|---|---|---|---|
| EP | 2801847 A1 | * | 11/2014 | | H01L 31/056 |
| JP | 2003075616 A | * | 3/2003 | | C04B 35/524 |

OTHER PUBLICATIONS

Carlin, Patrick; Lightweight Mirror Systems for Spacecraft—An Overview of Materials & Manufacturing Needs, IEEE (Year: 2000).*

(Continued)

*Primary Examiner* — Nathan L Van Sell
(74) *Attorney, Agent, or Firm* — BakerHostetler (57) ABSTRACT

A foam core mirror includes a transparent mirror layer, a foam core layer, and a backing layer. One face of the transparent mirror layer is hard-coated to increase scratch resistance and/or wear resistance, and another face of the transparent mirror layer is metalized to provide reflective mirror properties. The foam core layer is arranged adjacent to the transparent mirror layer and includes lightweight foam material. The backing layer is arranged adjacent to the foam core layer and includes a high tensile strength material.

17 Claims, 7 Drawing Sheets

(56) References Cited

U.S. PATENT DOCUMENTS

| | | | | |
|---|---|---|---|---|
| 2013/0215500 A1* | 8/2013 | Mochizuki | .............. | F24S 23/82 |
| | | | | 359/360 |
| 2013/0279001 A1* | 10/2013 | Mochizuki | ........... | G02B 5/0808 |
| | | | | 359/361 |
| 2014/0340741 A1* | 11/2014 | Adachi | ................. | H01L 31/056 |
| | | | | 359/360 |
| 2015/0286039 A1* | 10/2015 | Greschik | ................ | G02B 7/183 |
| | | | | 359/853 |
| 2017/0022344 A1* | 1/2017 | Kenkare | .................... | C08J 9/00 |
| 2017/0361545 A1* | 12/2017 | Ruckdaschel | ............ | C08J 9/142 |

OTHER PUBLICATIONS

WO-2011151030-A2 Translation & Original Document, Niederfuehr M L (Year: 2011).*

* cited by examiner

FOAM CORE MIRROR CONFIGURED FOR INTERIOR AEROSPACE APPLICATIONS AND A PROCESS OF IMPLEMENTING THE SAME

FIELD OF THE DISCLOSURE

The disclosure generally relates to a mirror configured for aerospace applications. More particularly, the disclosure relates to a mirror with a foam core configured for aerospace applications. The disclosure also generally relates to a process of implementing a mirror configured for aerospace applications. More particularly, the disclosure relates to a process of implementing a mirror having a foam material core configured for aerospace applications.

BACKGROUND OF THE DISCLOSURE

Current implementations of mirrors for aerospace applications such as applications in commercial aircraft, business aircraft, and the like include glass mirrors, synthetic material mirrors (e.g., Thermoplastic), and polished metal material mirrors. However, these prior art mirror configurations provide less than satisfactory function, performance, and the like when utilized in aerospace applications.

Polished metal material mirrors provide a substandard reflective surface and/or a substandard reflective functionality. Accordingly, utilizing polished metal material mirrors in aerospace applications is less than satisfactory. Moreover, utilizing polished metal material mirrors includes the use of heavier metal components adding undesirable weight to an aircraft.

Glass mirrors provide better reflective mirror properties than polished metal material mirrors. However, the glass mirrors are heavy, fragile, and present a hazard due to the possibility of breaking or being broken that results in sharp broken material. This can provide an obvious hazard to passengers, crew, and the like. Accordingly, utilizing glass mirrors in aerospace applications is less than satisfactory.

Mirrors using synthetic materials are typically formed as a semi-flexible sheet that can be installed "not flat" that results in a poor reflection. In particular, such "not flat" installations may have rippling and other problems that result in a less than optimal reflective functionality. For example, these synthetic material mirrors can impart a fun house type of reflection. Accordingly, utilizing synthetic material mirrors in aerospace applications is less than satisfactory. Moreover, synthetic material mirrors also add undesirable weight to an aircraft.

Therefore, a mirror configured for aerospace applications is needed to provide optimal reflective mirror properties, light-weight, resistance to deformation, and an ability to operate in extreme conditions.

SUMMARY OF THE DISCLOSURE

The foregoing needs are met, to a great extent, by the disclosure, wherein in one aspect a mirror configured for aerospace applications is provided and in another aspect a process of implementing a mirror configured for aerospace applications is provided.

An aspect of the disclosure pertains to a foam core mirror configured to be implemented in an aircraft application. This foam core mirror may include a transparent mirror layer, a foam core layer, and a backing layer. One face of the transparent mirror layer may be hard-coated to increase scratch resistance and/or wear resistance, and another face of the transparent mirror layer may be metalized to provide reflective mirror properties. The foam core layer may be arranged adjacent to the transparent mirror layer and may include a lightweight foam material. The backing layer may be arranged adjacent to the foam core layer and may include a high tensile strength material.

Another aspect of the disclosure includes a first adhesive layer and a second adhesive layer. The first adhesive layer may be arranged between the transparent mirror layer and the foam core layer, and the second adhesive layer may be arranged between the foam core layer and the backing layer.

The aerospace foam core mirror is configured such that an associated specific optical smoke density (Ds) may not exceed 200 consistent with a flammability requirement under FAR 25.853. The aerospace foam core mirror is configured such that an average burn rate when tested meets a 12 second vertical burn per FAR/JAR 25.853, Appendix F, part I Yet another aspect of the disclosure includes a treatment on one face of the transparent mirror layer. The transparent mirror layer may be hard-coated by a wet process. The wet process of the transparent mirror layer hard coating may include, but is not limited to, a flow coating, a spray coating, a chemical deposition coating, a physical deposition coating, and a flat-line reciprocator coating. The transparent mirror layer may be hard-coated with, for example, siloxane. Other materials are contemplated as well.

Yet still another aspect of the disclosure is related to a treatment on another face of the transparent mirror layer. The transparent mirror layer may be metalized. The metallization of the transparent mirror layer may be formed by, for example, coating by vacuum deposition. Other materials are contemplated as well. The metallization of the transparent mirror layer may be formed by lamination or by sputter deposition. Other processes are contemplated as well.

One general aspect includes an aerospace foam core mirror configured to be implemented in an aircraft application including: a transparent mirror layer having a first transparent mirror layer face and a second transparent mirror layer face, where said first transparent mirror layer face is hard-coated to increase scratch resistance and/or wear resistance and said second transparent mirror layer face is metalized to provide reflective mirror properties; a foam core layer having a first core layer face and a second core layer face, said foam core layer including a lightweight foam material, where said first core layer face is arranged adjacent to said second transparent mirror layer face; and a backing layer including a high tensile strength material, said backing layer having a first backing layer face and a second backing layer face, where said first backing layer face is arranged adjacent to said second core layer face.

One general aspect includes a process of producing an aerospace foam core mirror configured to be implemented in an aircraft application, including: providing a transparent mirror layer having a first transparent mirror layer face and a second transparent mirror layer face, where said first transparent mirror layer face is hard-coated to increase scratch resistance and/or wear resistance and said second transparent mirror layer face is metalized to provide reflective mirror properties; providing a foam core layer having a first core layer face and a second core layer face including a lightweight foam material; providing a first adhesive and arranging said first adhesive between said second transparent mirror layer face and said first core layer face; providing a backing layer including a high tensile strength material, said backing layer having a first backing layer face and a second backing layer face; and providing a second adhesive and arranging said second adhesive between said second core layer face and said first backing layer face.

There has thus been outlined, rather broadly, certain aspects of the disclosure in order that the detailed description thereof herein may be better understood, and in order that the present contribution to the art may be better appreciated. There are, of course, additional aspects of the disclosure that will be described below and which will form the subject matter of the claims appended hereto.

In this respect, before explaining at least one aspect of the disclosure in detail, it is to be understood that the disclosure is not limited in its application to the details of construction and to the arrangements of the components set forth in the following description or illustrated in the drawings. The disclosure is capable of aspects in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the disclosure. It is important, therefore, that the claims be regarded as including such equivalent constructions insofar as they do not depart from the spirit and scope of the disclosure.

DETAILED DESCRIPTION

The foregoing and other objectives, features, and advantages of the disclosure will become more apparent from the following detailed description taken in conjunction with the accompanying drawings.

Mirrors in aerospace applications present a number of critical issues that are not issues in other non-aerospace applications, including safety, high usage, and weight. Accordingly, the disclosed mirror configured and implemented for aerospace applications addresses safety, high usage, and weight.

Additionally, weight is a critical issue for mirrors in aerospace applications. Because of the nature of flight, it is critical to reduce weight of every component in aerospace applications, including mirrors, to improve efficiency and aircraft operation.

Hereinafter, a foam core mirror and a method of producing the foam core mirror according to the disclosure will be described in detail with reference to the accompanying drawings. The described aspects are provided so that those skilled in the art can easily understand the technical spirit of the disclosure, and thus the disclosure is not limited thereto. In addition, the accompanying drawings are schematic drawings for easily understanding the aspects of the disclosure and thus the matters represented in the accompanying drawings may be different from those actually implemented.

Meanwhile, each component shown below is only an example for implementing the disclosure. Therefore, other components may be used in other implementations of the disclosure without departing from the spirit and scope of the disclosure.

Additionally, it should be understood that the expression "including" certain elements is an "open type" expression indicating certain components and does not exclude additional components.

Figure 1:
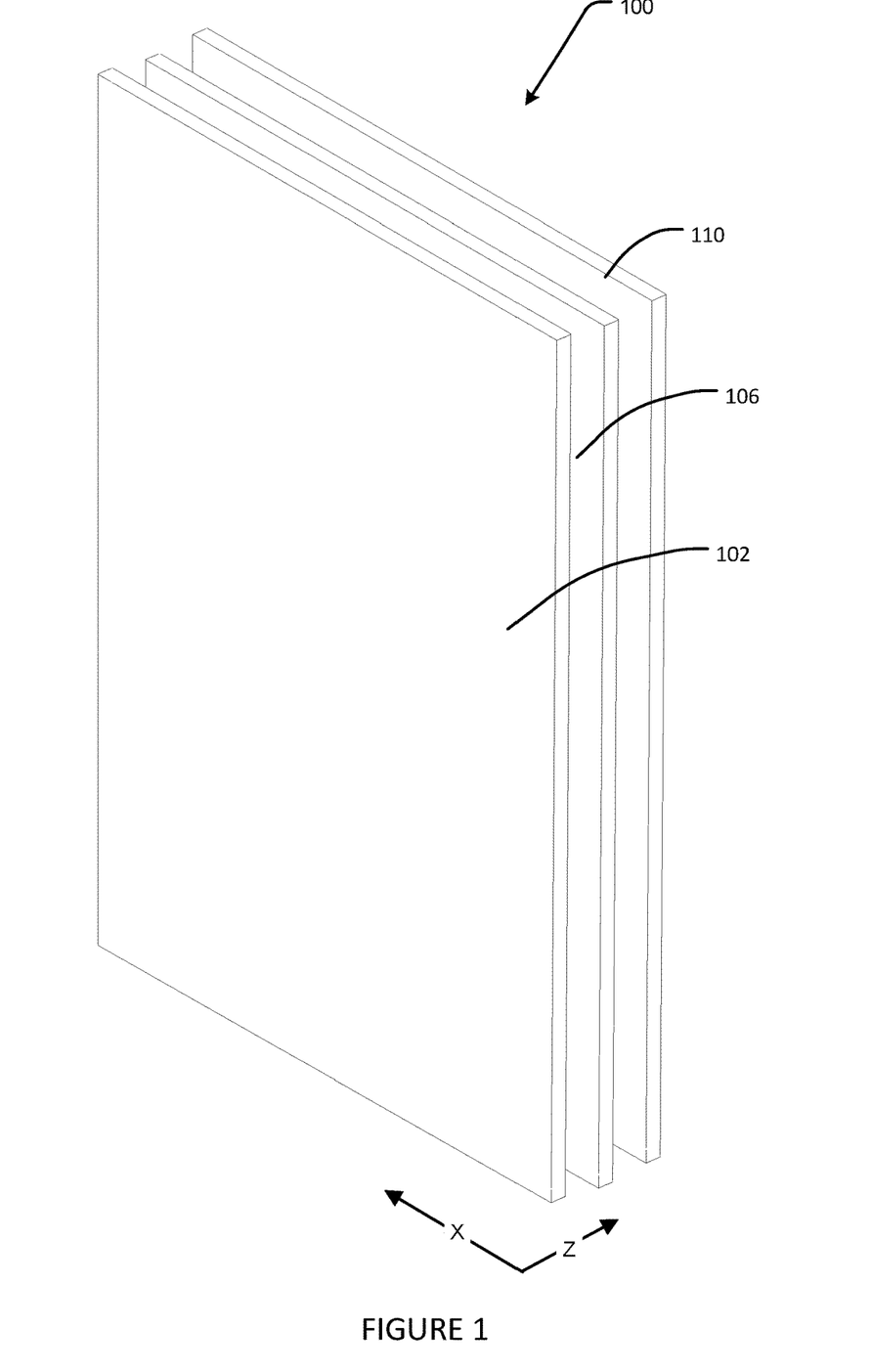
FIG. 1 is a perspective exploded view of a foam core mirror for interior aerospace applications according to an aspect of the disclosure.

FIG. 1 is a perspective exploded view of a foam core mirror for interior aerospace applications according to an aspect of the disclosure.

Figure 2:
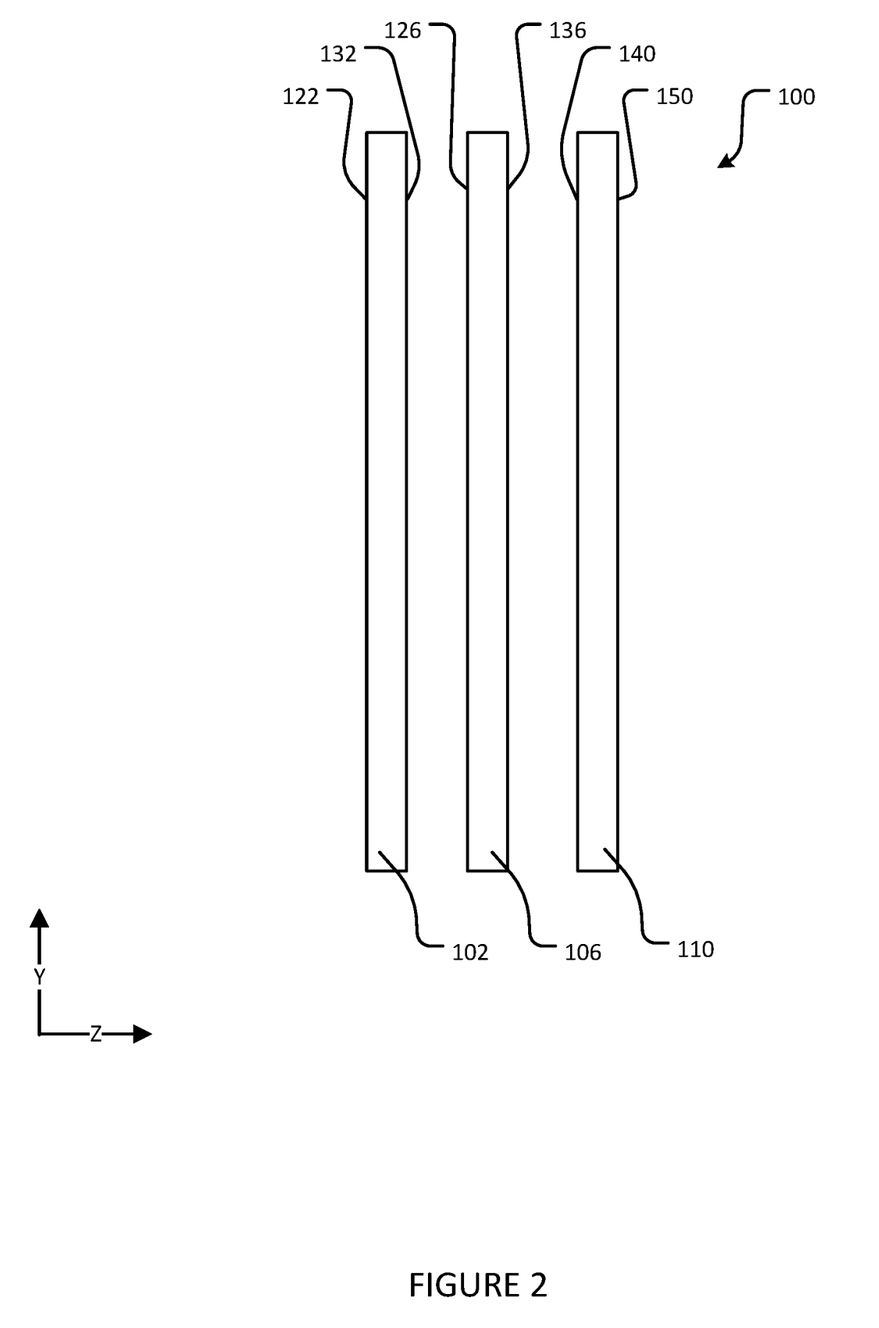
FIG. 2 is a cross sectional exploded view of a foam core mirror for interior aerospace applications according to FIG. 1.

FIG. 2 is a cross sectional exploded view of a foam core mirror for interior aerospace applications according to FIG. 1.

Figure 3:
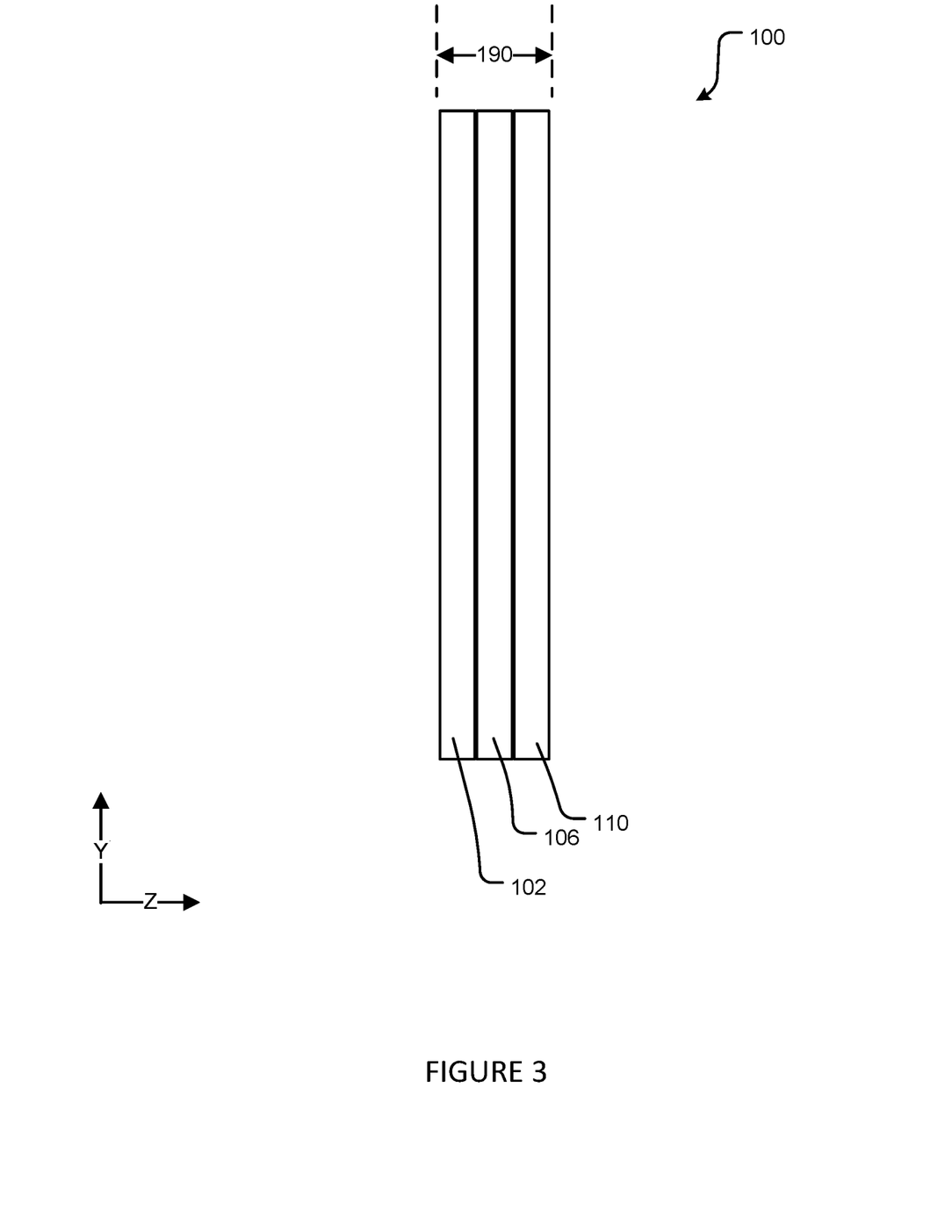
FIG. 3 is a cross sectional view of a foam core mirror for interior aerospace applications according to FIG. 1.

FIG. 3 is a cross sectional view of a foam core mirror for interior aerospace applications according to FIG. 1.

In particular, FIG. 1 illustrates a foam core mirror 100 for aerospace applications such as an aircraft application. The foam core mirror 100 may be configured and arranged for use in an aircraft cabin and/or aircraft cockpit. For example, the foam core mirror 100 may be configured and arranged for use in an aircraft lavatory, decorative bars, branding panels, galleys, and/or the like areas of an aircraft cabin and/or aircraft cockpit. Additionally, the foam core mirror 100 of the disclosure may be configured to implement sheet configurations, may be modified for specific aerospace or aircraft configurations formed from the sheet configurations, and/or may be modified for specific decorative shapes for aerospace or aircraft configurations formed from the sheet configurations. Alternatively, the foam core mirror 100 may be implemented as a standalone configuration.

The foam core mirror 100 may include at least three different layers of materials. In particular, the foam core mirror 100 may include at least three different layers of materials configured as a laminate structure. The foam core mirror 100 may include a transparent mirror layer 102 that may be configured to have reflective mirror properties. The transparent mirror layer 102 may include a transparent material. The transparent mirror layer 102 may possess high tensile strength configured to be operated in extreme conditions. Likewise, the transparent mirror layer 102 may be configured to include high elasticity to reduce a likelihood that the transparent mirror layer 102 does not break in extreme conditions. Moreover, the transparent mirror layer 102 may be configured as a rigid surface. Non-limiting examples of the material of the transparent mirror layer 102 may include polycarbonate materials, glass derivative materials, and/or the like.

Additionally, it is important that an outer surface of the foam core mirror 100 is highly wear resistant. For example, the outer surface of the foam core mirror 100 does not substantially wear when utilized in high usage applications associated with commercial aircraft and/or business aircraft.

In this regard, should the outer surface of the foam core mirror 100 be easily worn, a transparency of the foam core mirror 100 may degrade, resulting in reduced reflection and less than satisfactory operation of the foam core mirror 100. As such, the transparent mirror layer 102 of the foam core mirror 100 is configured to have high wear resistance, high scratch resistance, and the like. Accordingly, an outer face 122 of the transparent mirror layer 102 may be hard-coated to increase scratch resistance and/or wear resistance. The outer face 122 of the transparent mirror layer 102 may be the outward surface when implemented within a commercial aircraft and/or business aircraft. The hard coating may be arranged on the outer face 122 of the transparent mirror layer 102. The hard coating may be applied by wet processes. Non-limiting examples of the wet process may include a flow coating process, a spray coating process, a chemical deposition coating process, a physical deposition coating process, a flat-line reciprocator coating process, and other like processes. A non-limiting example of the coating material on the outer face 122 of the transparent mirror layer 102 may include siloxane. In one aspect, the hard coating may be applied by a flow coating process utilizing siloxane, a spray coating process utilizing siloxane, a chemical deposition coating process utilizing siloxane, a physical deposition coating process utilizing siloxane, a flat-line reciprocator coating process utilizing siloxane, and other like processes utilizing siloxane. The hard coating may be applied by other processes and the hard coating may utilize other materials.

Additionally, it is also important that the foam core mirror 100 possess good reflectivity properties. Thus, an inner surface 132 of the transparent mirror layer 102 may be metalized. The inner surface 132 of the transparent mirror layer 102 may be coated by vacuum deposition of one or more metals to provide reflective properties to the foam core mirror 100. Alternatively, the inner surface 132 of the transparent mirror layer 102 may be coated by sputter deposition of one or more metals to provide reflective properties to the foam core mirror 100. Moreover, other coating technologies may be utilized to provide reflective properties to the foam core mirror 100. Additionally, other reflective materials may be used in coating, deposition, or the like for the inner surface 132 of the transparent mirror layer 102 to provide reflective properties to the foam core mirror 100 and are accordingly within the scope of the disclosure.

Next, a core layer 106 may be configured and arranged adjacent to the inner surface 132 of the transparent mirror layer 102. In other words, the first surface 126 of the core layer 106 may be arranged adjacent to the inner surface 132 of the transparent mirror layer 102. The shape of the core layer 106 may be configured to match the shape of the transparent mirror layer 102. The core layer 106 and the transparent mirror layer 102 may be attached together by the inner surface 132 of the transparent mirror layer 102 and the first surface 126 of the core layer 106. In particular, the core layer 106 and the transparent mirror layer 102 may be attached together by the inner surface 132 of the transparent mirror layer 102 and the first surface 126 of the core layer 106 by an adhesive. The adhesive may be an epoxy adhesive, an epoxy based adhesive, or the like. However, other attachment technology is contemplated and may be utilized as well.

The core layer 106 may include a light weight foam material. The core layer 106 may be configured to absorb substantial force applied to the foam core mirror 100. The core layer 106 may also be configured to reduce weight of the foam core mirror 100. Non-limiting examples of the materials used for the core layer 106 may be polyetherimide, polyphenylsulfone, and/or polycarbonate. In particular, the materials used for the core layer 106 may be a polyetherimide foam material, a polyphenylsulfone foam material, and/or a polycarbonate foam material. Other types of foam materials are contemplated as well. Additionally, other thick and robust materials may be utilized such as honeycomb constructions.

A backing layer 110 may be configured to be arranged adjacent to the core layer 106. A first face 140 of the backing layer 110 may be arranged adjacent to the second face 136 of the core layer 106. The shape of the backing layer 110 may be configured to match the shape of the core layer 106. The core layer 106 and the backing layer 110 may be attached together by the first face 140 of the backing layer 110 and the second face 136 of the core layer 106. The core layer 106 and the backing layer 110 may be attached together by the first face 140 of the backing layer 110 and the second face 136 of the core layer 106 by an adhesive. The adhesive may be an epoxy adhesive, an epoxy based adhesive, or the like. However, other attachment technology is contemplated and may be utilized as well.

A second face 150 of the backing layer 110 may be configured to be attached to a wall or other surface of lavatories, decorative bars, branding panels, galleys, and/or the like areas of an aircraft cabin and/or aircraft cockpit. Alternatively, the second face 150 of the backing layer 110 may be configured such that the foam core mirror 100 is implemented as a standalone configuration. Moreover, the backing layer 110 may be configured as a rigid surface.

The backing layer 110 may be configured to absorb substantial force applied from the second face 150 of the backing layer 110. As such, the backing layer 110 may be configured to possess high tensile strength to be operated in extreme conditions. Likewise, the backing layer 110 may be configured to possess high elasticity so that it does not break in extreme conditions. Non-limiting examples of the material of the backing layer may include polyetherimide, polyphenylsulfone, glass epoxy, glass derivatives, combinations thereof, and/or the like.

Accordingly, the foam core mirror 100 that may include at least three different layers of materials as described herein and the foam core mirror 100 forms a rigid and highly resistant to deformation laminate structure. In particular, the foam core mirror 100 that may include at least the transparent mirror layer 102, the core layer 106, and the backing layer 110 as described herein forms a structure where at least the transparent mirror layer 102 forms a rigid surface and the backing layer 110 forms a rigid surface. Moreover, the foam core mirror 100 having the transparent mirror layer 102 that forms a rigid surface, the backing layer 110 that forms a rigid surface, and the core layer 106 that separates the transparent mirror layer 102 from the backing layer 110 may be configured such that the foam core mirror 100 implements a laminate structure and/or system having a high moment of inertia. In particular, the transparent mirror layer 102 and the backing layer 110 may resist a bending moment about the X axis and the backing layer 110 may resist substantial shear force.

Figure 4:
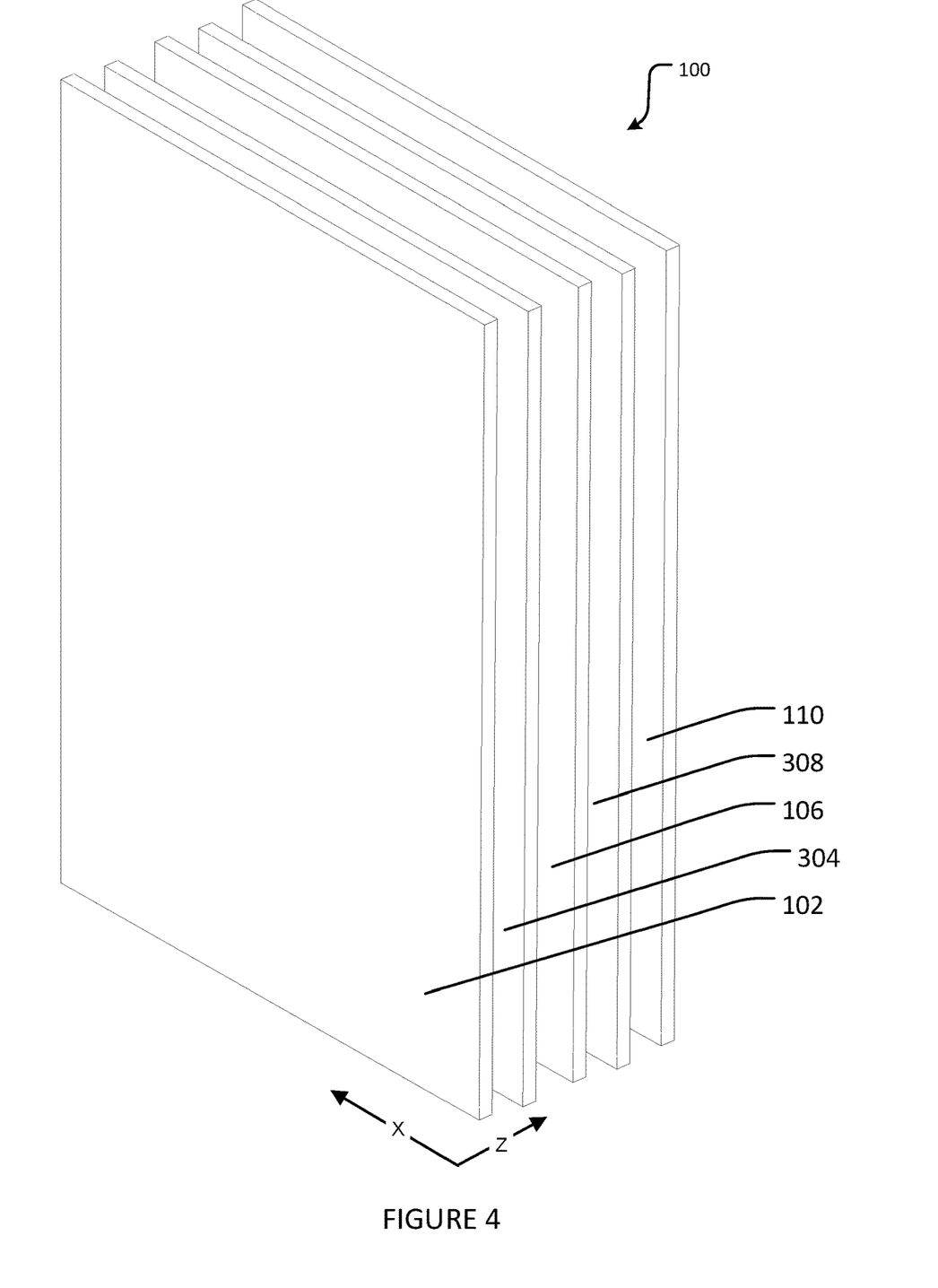
FIG. 4 is a perspective exploded view of a foam core mirror for interior aerospace applications according to an aspect of the disclosure.

FIG. 4 is a perspective exploded view of a foam core mirror for interior aerospace applications according to an aspect of the disclosure.

Figure 5:
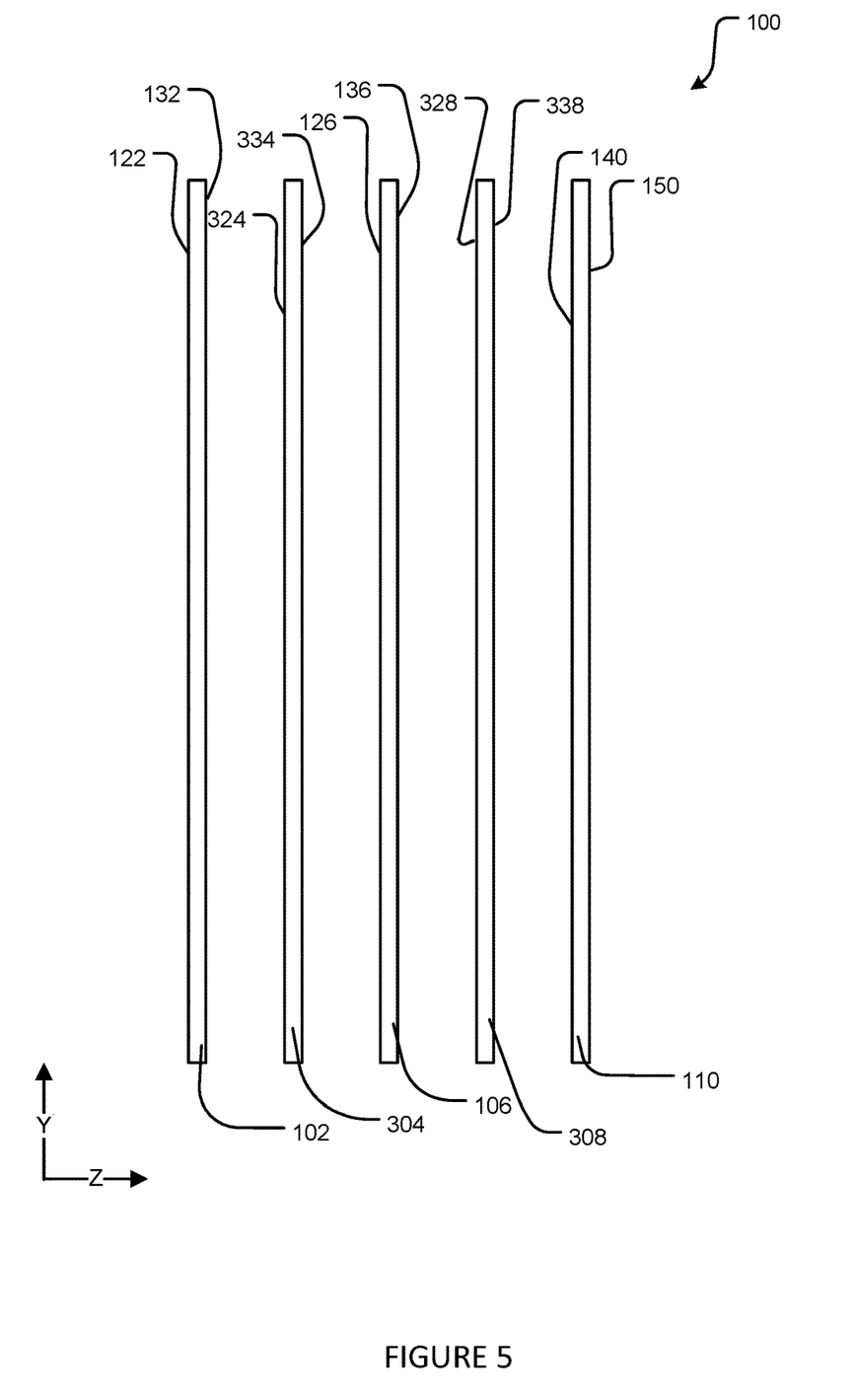
FIG. 5 is a cross sectional exploded view of a foam core mirror for interior aerospace applications according to FIG. 4.

FIG. 5 is a cross sectional exploded view of a foam core mirror for interior aerospace applications according to FIG. 4.

Figure 6:
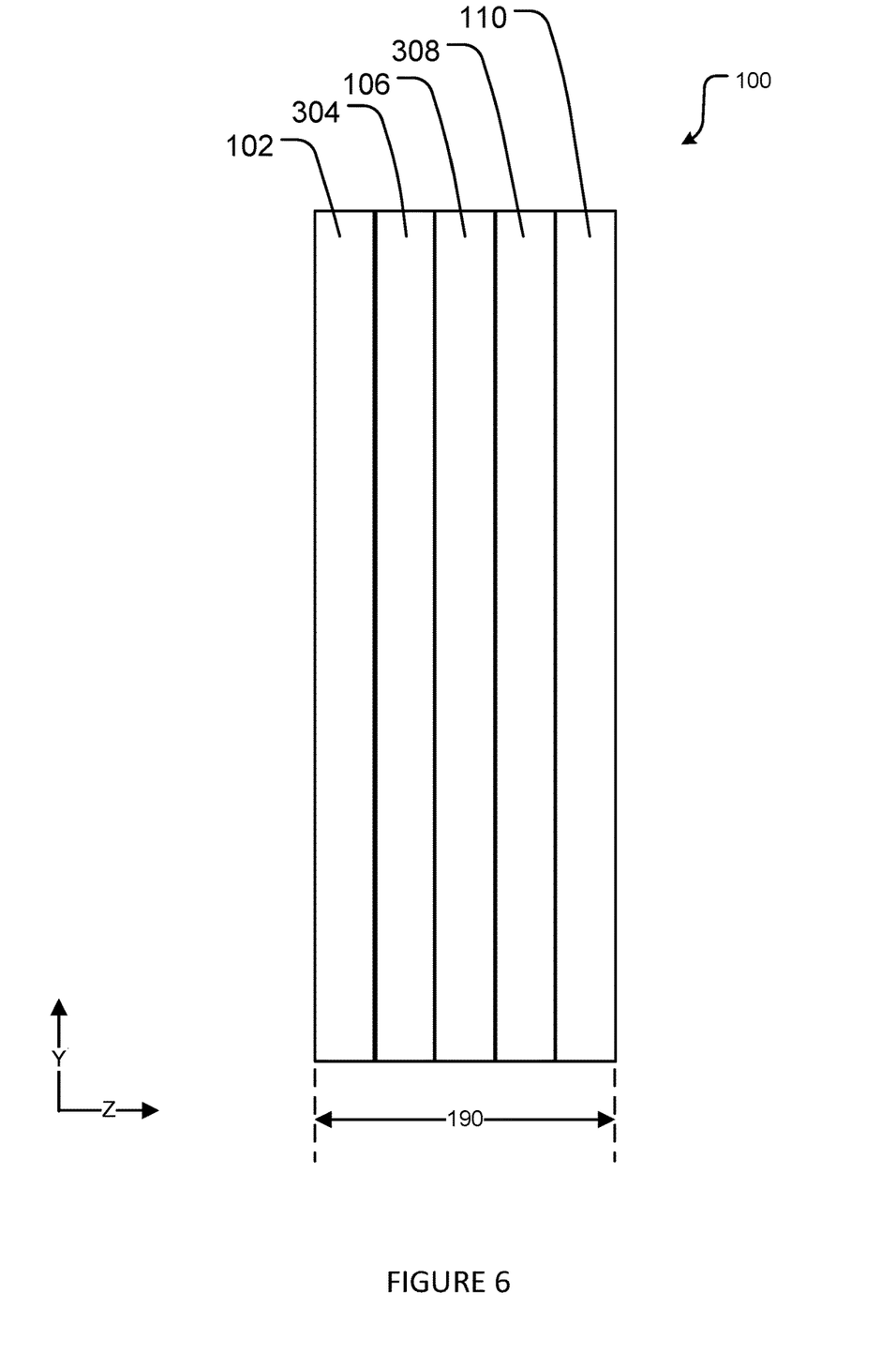
FIG. 6 is a cross sectional view of a foam core mirror for interior aerospace applications according to FIG. 4.

FIG. 6 is a cross sectional view of a foam core mirror for interior aerospace applications according to FIG. 4.

In another aspect of this disclosure, the foam core mirror 100 may include at least five different layers of materials. The foam core mirror 100 may include the transparent mirror layer 102, the core layer 106, and the backing layer 110 as described herein.

Additionally, the foam core mirror 100 may include a first adhesive layer 304. The first adhesive layer 304 may be configured and arranged adjacent to the inner surface 132 of the transparent mirror layer 102. In other words, an outer surface 324 of the first adhesive layer 304 may be arranged to be adjacent to the inner surface 132 of the transparent mirror layer 102. The shape of the first adhesive layer 304 may be configured to match the shape of the transparent mirror layer 102, and the first adhesive layer 304 and the transparent mirror layer 102 may share a same mating surface.

The outer surface 324 of the first adhesive layer 304 may be configured to be attached to the inner surface 132 of the transparent mirror layer 102. The first adhesive layer 304 may be configured to be a film type adhesive. Alternatively, the first adhesive layer 304 may be configured to be a spray type adhesive. In some aspects, the first adhesive layer 304 may not match the shape of the transparent mirror layer 102. However, the first adhesive layer 304 may be configured to cover the majority of the inner surface 132 of the transparent mirror layer 102. The first adhesive layer 304 may include an epoxy adhesive, an epoxy based adhesive, or the like.

The core layer 106 may be arranged so that the first surface 126 of the core layer 106 may be adjacent to an inner surface 334 of the first adhesive layer 304. As shown, the shape of the core layer 106 may be configured to match the shape of the first adhesive layer 304. In some aspects, the first adhesive layer 304 may not match the shape of the core layer 106. However, the first adhesive layer 304 may be configured to cover the majority of the first surface 126 of the core layer 106. The core layer 106 may include a light weight foam material as described herein.

A second adhesive layer 308 may be configured and arranged adjacent to the second face 136 of the core layer 106. In other words, an outer surface 328 of the second adhesive layer 308 may be arranged to be adjacent to the second face 136 of the core layer 106. The shape of the second adhesive layer 308 may be configured to match the shape of the core layer 106, and the second adhesive layer 308 and the core layer 106 may share a same mating surface.

The second adhesive layer 308 may be configured to be attached to the second face 136 of the core layer 106. The second adhesive layer 308 may be configured to be a film type adhesive. Alternatively, the second adhesive layer 308 may be configured to be a spray type adhesive. In some aspects, the second adhesive layer 308 may not match the shape of the core layer 106. However, the second adhesive layer 308 may be configured to cover the majority of the second face of the core layer 106. The second adhesive layer 308 may include an epoxy adhesive, an epoxy based adhesive, or the like.

The backing layer 110 may be arranged so that the first face 140 of the backing layer 110 may be adjacent to an inner surface 338 of the second adhesive layer 308. As shown, the shape of the backing layer 110 may be configured to match the shape of the second adhesive layer 308. In some aspects, the second adhesive layer 308 may not match the shape of the backing layer 110. However, the second adhesive layer 308 may be configured to cover the majority of the first face of the backing layer 110. Accordingly, the foam core mirror 100 that may include at least five different layers of materials as described herein and the foam core mirror 100 forms a rigid and highly resistant to deformation laminate structure. In particular, the foam core mirror 100 that may include at least the transparent mirror layer 102, the core layer 106, and the backing layer 110 as described herein forms a structure where at least the transparent mirror layer 102 forms a rigid surface and the backing layer 110 forms a rigid surface. Moreover, the foam core mirror 100 having the transparent mirror layer 102 that forms a rigid surface, the backing layer 110 that forms a rigid surface, and the core layer 106 that separates the transparent mirror layer 102 from the backing layer 110 may be configured such that the foam core mirror 100 implements a laminate structure and/or system having a high moment of inertia. In particular, the transparent mirror layer 102 and the backing layer 110 may resist a bending moment about the X axis and the backing layer 110 may resist substantial shear force.

The layers illustrated and described with respect to FIGS. 1-6 have been illustrated to include rectangular shapes. However, the foam core mirror 100 is not limited to a rectangular shape. The foam core mirror 100 may be implemented to have a decorative shape. The foam core mirror 100 may be implemented as any shape, such as a circle, an ellipse, an oval, a triangle, a pentagon, a hexagon, and/or the like. The foam core mirror 100 may be implemented as an irregular shape. Moreover, in some aspects, the inner surface 132 may be masked to limit metalizing on the inner surface 132 and subsequent layers may be machined away to allow light to come through specific areas of the foam core mirror 100. In these areas, there is not reflective property for the foam core mirror 100.

In another aspect of this disclosure, the foam core mirror 100 may include at least four different layers of materials, some of which have been previously described herein. Additionally, the foam core mirror 100 may include a metallized layer. The metallized layer may be implemented as described herein with respect to the inner surface 132.

In the various aspects described herein, a thickness 190 of the foam core mirror 100 may be configured to be less than 9.0 mm (millimeters), where the thickness 190 is a distance defined between the outer face 122 of the transparent mirror layer 102 and the second face 150 of the backing layer 110 and/or the thickness 190 is a distance defined by the arrows illustrated in FIG. 3 and FIG. 6. In particular, the thickness 190 of the foam core mirror 100 may be configured, but not limited, to be 3 mm-4 mm, 4 mm-5 mm, 5 mm-6 mm, 6 mm-7 mm, 7 mm-8 mm, or 8 mm-9 mm.

Configurations of various layers described herein of the foam core mirror 100 may be configured to reduce a total weight of the foam core mirror 100, for example, but not limited to, by at least 10%-30%, 10%-20%, 15%-25%, or 20%-30% in comparison to the prior art mirror configurations. In one aspect, the various layers described herein of the foam core mirror 100 may be configured to reduce a total weight of the foam core mirror 100 by 10%-30%, 10%-20%, 15%-25%, or 20%-30% in view a single layer 3.0 mm polycarbonate mirror with equal or greater flexural modulus.

Materials of the foam core mirror 100 are configured to be in compliance with 14 C.F.R. § 25.853 (or FAR 25.853). Additionally, the materials of the foam core mirror 100 are configured to be in compliance with appendix F of 14 C.F.R. § 25.853. Both documents are incorporated entirely herein.

Appendix F of 14 C.F.R. § 25.853 provides several material test criteria, and the materials used in the foam core mirror 100 of the disclosure, including the transparent mirror layer 102, the first adhesive layer 304, the core layer 106, the second adhesive layer 308, the metallized layer, and/or the backing layer 110 are configured and manufactured in compliance with the test criteria. Among others, materials used in foam core mirror 100 are configured to pass a 12 second vertical burn per FAR/JAR 25.853, Appendix F, part I.

Materials used in the foam core mirror 100, individually and collectively, are configured to pass a 12 second vertical burn per FAR/JAR 25.853, Appendix F, part I. Additionally, the specific optical smoke density (Ds), which is obtained by averaging the readings of three specimens of the foam core mirror 100 obtained after 4 minutes of the ASTM F814-83 test are configured to not exceed 200.

Figure 7:
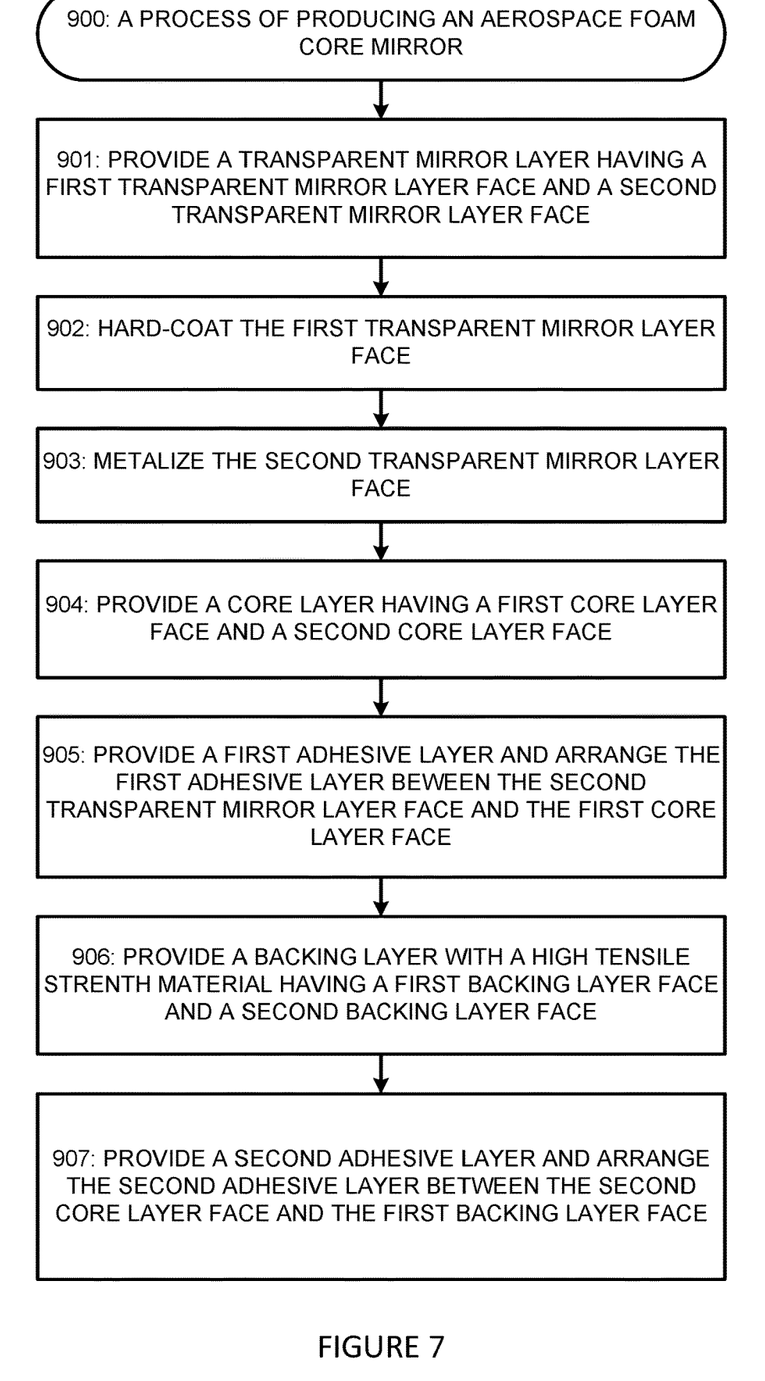
FIG. 7 illustrates a process of implementing a foam core mirror for interior aerospace applications according to an aspect of the disclosure.

FIG. 7 illustrates a process of implementing a foam core mirror for interior aerospace applications according to an aspect of the disclosure.

In particular, FIG. 7 illustrates a process of producing an aerospace foam core mirror 900. It should be noted that the process of producing an aerospace foam core mirror 900 is merely exemplary and may be modified consistent with the various aspects disclosed herein. In this regard, each of the processes described may be implemented in a different order. First, a transparent mirror layer may be provided 901. The transparent mirror layer may include a first transparent mirror layer face and a second transparent mirror layer face as described herein. Next, the first transparent mirror layer face may be hard coated 902 as described herein. Then, the second transparent mirror layer face may be metalized 903 as described herein.

Next, a core layer may be provided 904. The core layer may include a first core layer face and a second core layer face as described herein. A first adhesive layer may be provided 905. The first adhesive layer may be arranged between the second transparent mirror layer face and the first core layer face. As described above, the first adhesive layer may be a film adhesive layer, a spray applied adhesive layer, and/or the like.

Next, a backing layer is provided 906. The backing layer may include a high tensile strength material as described herein. The backing layer may include a first backing layer face and a second backing layer face as described herein.

Finally, a second adhesive layer is provided 907. The second adhesive layer may be arranged between the second core layer face and the first backing layer face as described herein.

Accordingly, the disclosure has set forth a mirror configured for aerospace applications that provides optimal reflective mirror properties, light-weight, resistance to deformation, and an ability to operate in extreme conditions.

The many features and advantages of the disclosure are apparent from the detailed specification, and thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure.

What is claimed is:

1. An aerospace foam core mirror configured to be implemented in an interior aircraft application comprising:
    a transparent mirror layer having a first transparent mirror layer face that is structured and arranged as an outer face and a second transparent mirror layer face that is structured and arranged as an inner face, wherein said first transparent mirror layer face is hard-coated to increase scratch resistance and/or wear resistance, the transparent mirror layer comprises a polycarbonate material, and said second transparent mirror layer face is metalized directly on the inner face to provide reflective mirror properties;
    a foam core layer having a first core layer face and a second core layer face, said foam core layer comprising a lightweight foam material, wherein said first core layer face is arranged adjacent to said second transparent mirror layer face; and
    a backing layer comprising a high tensile strength material, said backing layer having a first backing layer face and a second backing layer face, wherein said first backing layer face is arranged adjacent to said second core layer face,
    wherein said foam core layer comprises at least one of the following: a polyetherimide foam material, a polyphenylsulfone foam material, and a polycarbonate foam material;
    wherein the transparent mirror layer comprises a transparent material; and
    wherein the transparent mirror layer, the foam core layer, and the backing layer are configured as a laminate structure.

2. The aerospace foam core mirror configured to be implemented in an interior aircraft application according to claim 1 further comprising:
    a first adhesive arranged between said second transparent mirror layer face and said first core layer face; and
    a second adhesive arranged between said second core layer face and said first backing layer face.

3. The aerospace foam core mirror configured to be implemented in an interior aircraft application according to claim 2, wherein:
    said first adhesive comprises at least one of the following: a film adhesive layer and a spray applied adhesive layer; and
    said second adhesive comprises at least one of the following: a film adhesive layer and a spray applied adhesive layer.

4. The aerospace foam core mirror configured to be implemented in an interior aircraft application according to claim 3, wherein:
    said first adhesive comprises epoxy; and
    said second adhesive comprises epoxy.

5. The aerospace foam core mirror configured to be implemented in an interior aircraft application according to claim 2, wherein a specific optical smoke density (Ds) of said aerospace foam core mirror does not exceed 200.

6. The aerospace foam core mirror configured to be implemented in an interior aircraft application according to claim 2, wherein said aerospace foam core mirror, said transparent mirror layer, said foam core layer, said backing layer, said first adhesive, and said second adhesive are each configured such that an average burn rate thereof does not exceed 2.5 inches per minute when tested horizontally by Method 5906 under FAR 25.853.

7. The aerospace foam core mirror configured to be implemented in an interior aircraft application according to claim 2, wherein said aerospace foam core mirror, said transparent mirror layer, said foam core layer, said backing layer, said first adhesive, and said second adhesive are each configured to support a 12 second vertical burn per FAR/JAR 25.853, Appendix F, part I.

8. The aerospace foam core mirror configured to be implemented in an interior aircraft application according to claim 1, wherein said first transparent mirror layer face of said transparent mirror layer comprises a wet process hard coating arranged on an outer face of said first transparent mirror layer face of said transparent mirror layer, and wherein said hard coating is structured and configured on the outer face of said first transparent mirror layer face of said transparent mirror layer with said wet process that comprises at least one of the following: a flow coating process, a spray coating process, a chemical deposition coating process, a physical deposition coating process, and a flat-line reciprocator coating process.

9. The aerospace foam core mirror configured to be implemented in an interior aircraft application according to claim 8, wherein said first transparent mirror layer face of said transparent mirror layer is hard-coated with siloxane.

10. The aerospace foam core mirror configured to be implemented in an interior aircraft application according to claim 1, wherein said second transparent mirror layer face of said transparent mirror layer comprises a vacuum deposition coating.

11. The aerospace foam core mirror configured to be implemented in an interior aircraft application according to claim 1, wherein said second transparent mirror layer face of said transparent mirror layer comprises a sputter deposition lamination.

12. The aerospace foam core mirror configured to be implemented in an interior aircraft application according to claim 1, wherein said backing layer comprises at least one of the following: a polyetherimide material, a polyphenylsulfone material, a polycarbonate material, a glass epoxy material, and a glass derivative material.

13. The aerospace foam core mirror configured to be implemented in an interior aircraft application according to claim 1 further comprising:
a first adhesive that attaches said second transparent mirror layer face to said first core layer face; and
a second adhesive that attaches said second core layer face and to first backing layer face.

14. The aerospace foam core mirror configured to be implemented in an interior aircraft application according to claim 2, wherein said first transparent mirror layer face of said transparent mirror layer comprises a hard coating arranged on an outer face of said first transparent mirror layer face of said transparent mirror layer that comprises siloxane.

15. An aerospace foam core mirror configured to be implemented in an interior aircraft application comprising:
a transparent mirror layer having a first transparent mirror layer face that is structured and arranged as an outer face and a second transparent mirror layer face that is structured and arranged as an inner face, wherein said first transparent mirror layer face is hard-coated to increase scratch resistance and/or wear resistance, the transparent mirror layer comprises a polycarbonate material, and said second transparent mirror layer face is metalized directly on the inner face to provide reflective mirror properties;
a foam core layer having a first core layer face and a second core layer face, said foam core layer comprising a lightweight foam material, wherein said first core layer face is arranged adjacent to said second transparent mirror layer face; and
a backing layer comprising a high tensile strength material, said backing layer having a first backing layer face and a second backing layer face, wherein said first backing layer face is arranged adjacent to said second core layer face;
a first adhesive arranged between said second transparent mirror layer face and said first core layer face; and
a second adhesive arranged between said second core layer face and said first backing layer face,
wherein the transparent mirror layer comprises a transparent material;
wherein the transparent mirror layer, the foam core layer, and the backing layer are configured as a laminate structure; and
wherein a thickness of said aerospace foam core mirror is 3.0 mm to 9.0 mm in total.

16. The aerospace foam core mirror configured to be implemented in an interior aircraft application according to claim 15, wherein said foam core layer comprises at least one of the following: a polyetherimide foam material, a polyphenylsulfone foam material, and a polycarbonate foam material.

17. An aerospace foam core mirror configured to be implemented in an interior aircraft application comprising:
a transparent mirror layer having a first transparent mirror layer face that is structured and arranged as an outer face and a second transparent mirror layer face that is structured and arranged as an inner face, wherein said first transparent mirror layer face is hard-coated to increase scratch resistance and/or wear resistance, the transparent mirror layer comprises a polycarbonate material, and said second transparent mirror layer face is metalized directly on the inner face to provide reflective mirror properties;
a foam core layer having a first core layer face and a second core layer face, said foam core layer comprising a lightweight foam material, wherein said first core layer face is arranged adjacent to said second transparent mirror layer face; and
a backing layer comprising a high tensile strength material, said backing layer having a first backing layer face and a second backing layer face, wherein said first backing layer face is arranged adjacent to said second core layer face,
wherein the transparent mirror layer comprises a transparent material; and
wherein the transparent mirror layer, the foam core layer, and the backing layer are configured as a laminate structure
wherein:
said first transparent mirror layer face of said transparent mirror layer comprises a hard coating arranged on an outer face of said first transparent mirror layer face of said transparent mirror layer with a wet process, wherein said hard coating is structured and configured on the outer face of said first transparent mirror layer face of said transparent mirror layer with said wet process that comprises at least one of the following: a flow coating process, a spray coating process, a chemical deposition coating process, a physical deposition coating process, and a flat-line reciprocator coating process;
said foam core layer comprises at least one of the following: a polyetherimide foam material, a polyphenylsulfone foam material, and a polycarbonate foam material;
said backing layer comprises at least one of the following: a polyetherimide material, a polyphenylsulfone material, a polycarbonate material, a glass epoxy material, and a glass derivative material; and a thickness of said aerospace foam core mirror is 3.0 mm to 9.0 mm in total.

* * * * *